United States Patent
Curtis

(10) Patent No.: US 9,459,755 B2
(45) Date of Patent: Oct. 4, 2016

(54) FACILITY OPERATIONS MANAGEMENT AND MOBILE SYSTEMS

(71) Applicant: Peter M. Curtis, Bethpage, NY (US)

(72) Inventor: Peter M. Curtis, Bethpage, NY (US)

(*) Notice: Subject to any disclaimer, the term of this patent is extended or adjusted under 35 U.S.C. 154(b) by 232 days.

(21) Appl. No.: 13/840,679

(22) Filed: Mar. 15, 2013

(65) Prior Publication Data

US 2014/0137024 A1 May 15, 2014

Related U.S. Application Data

(60) Provisional application No. 61/796,391, filed on Nov. 13, 2012.

(51) Int. Cl.
| | |
|---|---|
| *G06F 3/0484* | (2013.01) |
| *G06F 3/0481* | (2013.01) |
| *G06F 9/44* | (2006.01) |
| *G06Q 10/06* | (2012.01) |

(52) U.S. Cl.
CPC ............... *G06F 3/0481* (2013.01); *G06F 8/38* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 3,992,786 | A * | 11/1976 | Greenberg et al. | 434/258 |
| 5,246,643 | A * | 9/1993 | Inaba et al. | 264/40.1 |
| 5,600,576 | A * | 2/1997 | Broadwater et al. | 702/187 |
| 5,864,784 | A | 1/1999 | Brayton et al. | |
| 6,304,851 | B1 | 10/2001 | Kmack et al. | |
| 7,173,528 | B1 * | 2/2007 | Stewart et al. | 340/572.3 |
| 7,177,821 | B2 * | 2/2007 | Ikeda et al. | 705/7.25 |
| 8,281,993 | B2 | 10/2012 | Sauerwein, Jr. et al. | |
| 2003/0036983 | A1 * | 2/2003 | Hougen et al. | 705/28 |
| 2004/0024788 | A1 * | 2/2004 | Hill | G06Q 10/06 |
| 2004/0107114 | A1 * | 6/2004 | Curtis | 705/1 |
| 2004/0255236 | A1 * | 12/2004 | Collart | 715/500.1 |
| 2006/0136841 | A1 * | 6/2006 | Fritz | 715/818 |
| 2007/0226258 | A1 * | 9/2007 | Lambdin | G02B 23/2469 |
| 2008/0177665 | A1 * | 7/2008 | Noordam | H04L 9/3236 705/50 |
| 2009/0251282 | A1 * | 10/2009 | Fitzgerald et al. | 340/5.31 |
| 2011/0137713 | A1 | 6/2011 | Dalgas et al. | |
| 2012/0023435 | A1 * | 1/2012 | Kneppers et al. | 715/780 |
| 2012/0054242 | A1 * | 3/2012 | Ferrara et al. | 707/783 |
| 2013/0331963 | A1 * | 12/2013 | Ahangar et al. | 700/83 |

* cited by examiner

*Primary Examiner* — Nhat-Huy T Nguyen

(57) ABSTRACT

A mobile system for managing a facility includes a display, a memory, and a processor. The memory comprises an application program. The program is configured to present a graphical user interface (GUI) on the display. The GUI enables a user to view and enter information about equipment in the facility. The application program stores the entered data in the memory. The processor is configured to execute the application program.

18 Claims, 13 Drawing Sheets

FACILITY OPERATIONS MANAGEMENT AND MOBILE SYSTEMS

CROSS-REFERENCE TO RELATED APPLICATION

The present application is based on provisional application Ser. No. 61/796,391, filed Nov. 13, 2012, the entire contents of which are herein incorporated by reference.

TECHNICAL FIELD

The present disclosure relates to management of facility operations, and more specifically, to a mobile system that is used to manage the facility operations.

DISCUSSION OF THE RELATED ART

Operating mission critical facilities may involve monitoring numerous building functions and equipment on a regular basis. If an individual performing such monitoring observes that equipment is operating outside of its designed limits, various steps may need to be taken to correct the situation.

Further, comparison of equipment data with benchmark values can provide a reasonable indication that equipment is close to failing or that it is operating near or exceeding its designed limits.

In the event of emergencies, equipment maintenance shutdowns, or other site specific events, facility engineers may be required to complete complex switching procedures.

SUMMARY

According to an exemplary embodiment of the invention, a mobile system for managing a facility includes a display, a memory, and a processor. The memory includes an application program. The program is configured to present a graphical user interface (GUI) on the display. The GUI enables a user to view and enter information about equipment in the facility. The application program stores the entered data in the memory. The processor is configured to execute the application program.

The GUI may enable the user to enter the information by providing a selectable option, which upon selection prompts the user to identify the equipment with an identifier. The mobile system may further include a camera and the selection may control the camera to capture an image of the equipment that is linked to the identifier. The GUI may enable the user to enter the information by providing a data entry field that identifies a data parameter of the equipment and enable the user to enter data for the data parameter. The entered data for the data parameter of the equipment may be stored in the memory along with a timestamp.

The program may be configured to perform an analysis of the data that has been entered for the data parameter of the equipment along with previously entered data to predict a future value of the data. The GUI may be configured to present a graph of the analyzed data and the predicted value on the display. The GUI may be configured to present a graph of the analyzed data, a trend line predicted from the analyzed data, and correlation with third party geographic or weather data on the display. The program may be configured to compare the entered data for the data parameter of the equipment against a normal operating range to determine whether the equipment is functioning properly. The program may be configured to provide a visual warning on the display if it is determined that the equipment is not functioning properly.

The GUI may enable the user to set the system into a training mode that prevents the application from sending a message to a remote party if it is determined that the equipment is not functioning properly. The mobile system may include a wireless transceiver and the application may send a message using the wireless transceiver if it is determined that the equipment is not functioning properly. The message may be sent via electronic mail, a short message service (SMS) text message, or a social network message across a network. The program may be configured to delete its locally stored data about the facility when it determines that mobile system has left the facility.

The system may further comprise a wireless transceiver and the program may upload the information to a remote database using the wireless transceiver. The system may include a wireless transceiver and the application may be configured to control the transceiver to communicate with a radio tag identifying the equipment, and instruct the GUI to automatically display the information. The radio tag may be a near field communication NFC tag or a radio frequency identification RFID tag.

According to an exemplary embodiment of the invention, a mobile system for managing a facility includes a display, a memory, and a processor. The memory includes an application program. The program is configured to present a graphical user interface (GUI) on the display. The GUI guides a user in a step-by-step fashion through a procedure associated with the facility. The processor is configured to execute the application program.

The procedure may be one of a standard operating procedure, an emergency action procedure, an emergency operating procedure, and a maintenance procedure and a method of procedure. The procedure may includes a plurality of textual steps, and the GUI may present a current one of the textual steps on the display and a selectable option that enables a user to select the option to indicate that the current one step has been completed. Upon the user selecting the option, the application may control the GUI to present a next one of the textual steps on the display.

The application program may be configured to control the GUI to indicate to the user that the procedure has been completed upon the user selecting the option that corresponds to a last one of the steps. The system may include a wireless transceiver and the application program may be configured to receive the procedure from a remote database using the wireless transceiver. The application program may store a record in the memory indicating that the procedure has been completed. The system may include a wireless transceiver and the application program may be configured to send a message across a network using the wireless transceiver when the procedure has been completed. The message may be sent via electronic mail, a short message service (SMS) text message, or a social network message.

According to an exemplary embodiment of the invention, a method of using a mobile system to manage a facility includes: displaying, by the mobile system, a graphical user interface (GUI) upon receiving a start command from a user of the system, wherein the GUI enables the user to enter and view information about equipment within the facility, determining, by the mobile system, whether the entered information is outside an operating range for the equipment, and presenting on a display of the mobile system, a warning if the information is determined to be outside the operating range.

The method may further include the mobile system wirelessly sending a message including the warning over a network. The message may be sent via an e-mail, a short message service (SMS) text message, or a social network message across the network. The method may further include the mobile system wirelessly communicating the entered information over a network to a remote database. The method may further include the mobile system wirelessly receiving the viewed information over a network from a remote database.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
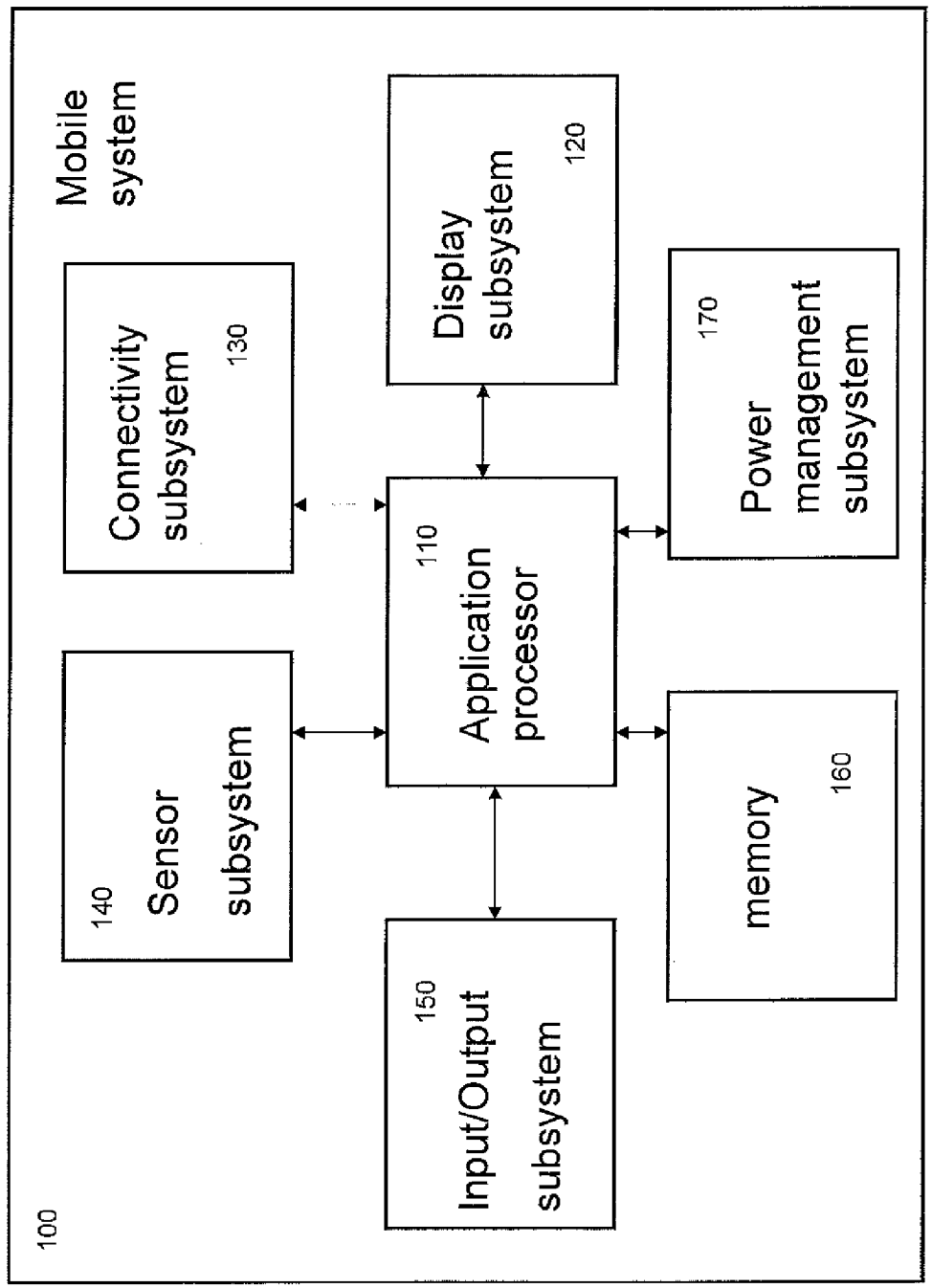
FIG. 1 is a schematic diagram illustrating a mobile system according to at least one exemplary embodiment of the invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

A facility engineer, operator, manager, or owner may utilize at least one embodiment of the invention as a tool for collecting and analyzing facility operational data. The data may also be associated with training simulations incorporated as part of the same system. In at least one embodiment, the invention presents a user with a graphical user interface (GUI) having data entry fields, into which equipment and facility operation data can be input. Once the data has been entered, at least one embodiment of the invention stores the data into a database where it may be compared against nominal benchmark values and analyzed for trends or anomalies.

Exemplary embodiments of the invention facilitates data collection from equipment in a facility such as an Uninterruptible Power Supply (UPS), a Power Transfer Switch (PTS), a Computer Room Air Conditioner (CRAC) units, Generators, Boilers, Heating Ventilation and Air Conditioning (HVAC) equipment, an Electrical Switchgear, information technology (IT) equipment, or any other types of equipment that may be included in a facility's core infrastructure. Examples of IT equipment include routers, switches, computers, servers, printers, fax machines, backup devices (e.g., RAID array), etc.

Exemplary embodiments of the invention may simplify routine operational tasks and provide access to a knowledge base customized with site specific facility documentation and benchmark data. Having this detailed documentation and benchmark data on hand can be an invaluable asset, especially when inevitable equipment failures occur. Further, during emergencies, human error may be mitigated and life safety may be increased by keeping documentation always on hand for personnel so it can be accessed easily when it is needed most.

Exemplary embodiments of the invention will be described below with respect to a mobile system. However, the invention is not limited to being applied to a mobile system. For example, the invention may be applied to stationary computer systems such as a main frame computer, a workstation, a desktop computer system, etc.

FIG. 1 is a schematic diagram illustrating an exemplary mobile system 100 in which an exemplary embodiment of the invention may be applied. As an example, the mobile system may be tablet computer, a mobile phone (e.g., a smartphone), a personal digital assistant (PDA), a laptop computer, etc.

Referring to FIG. 1, the mobile system 100 includes an application processor 110, a display subsystem 120, a connectivity subsystem 130, a sensor subsystem 140, an input/output device controller 150, a memory 160, and a power management system 170. The mobile system 100 may omit any one of the illustrated elements shown in FIG. 1 or may include additional elements.

The application processor 110 may be configured to execute a computer program that launches the GUI, which enables a user to enter data about equipment in one or more facilities, and interprets the entered data to provide feedback to the user. The computer program may be stored in memory 160. The computer program will be discussed in more detail below.

The display subsystem 120 may include a display (e.g., a liquid crystal display) and a display interface to communicate with the display. The display may be a touch screen and accordingly the display subsystem 120 may include a touch interface. The display subsystem 120 may include an interface (e.g., an HDMI interface) for output of display images to a remote display, television, etc.

The connectivity subsystem 130 enables the mobile system to communicate with other devices (e.g., a mainframe, a workstation, a server, a database, a desktop computer, a tablet computer, another mobile system, etc.). The connectivity subsystem 13 includes a wireless transceiver that enables the mobile system 100 to wirelessly communicate with the other devices. The connectivity subsystem 13 may include the technology (e.g., suitable hardware and/or software) to exchange data wirelessly (e.g., using radio waves) over a computer network (e.g., the Internet). This technology may enable Wi-Fi communications based on the IEEE 802.11 standard, Bluetooth communications, Near Field Communications (NFC), Radio Frequency Identification (RFID), Infrared, etc.

The sensors subsystem 140 may include one or more sensors, such as an ambient light sensor, a proximity sensor, a global positioning system (GPS), a compass, an accelerometer, a gyroscope, etc.

The input/output (I/O) subsystem 150 may provide an interface to input devices, such as an external keyboard and a mouse, and an interface to an output device such as a printer. The I/O subsystem 150 may include a digital camera controlled by the applications processor 110 or by a controller of the I/O subsystem 150 for capturing images. The images may be stored in a memory or a buffer of the I/O subsystem 150 or the memory 160.

The memory 160 may be embodied by various types of volatile or non-volatile memory devices. For example, the memory 160 may flash memory, such as an SD card, an MMC card, an eMMC card, hard drive, etc.

The power management subsystem 170 may include a battery, an interface for receiving power from an external battery, software and/or hardware to manage power usage of the mobile system 100, etc. The power management subsystem may include an AC power adaptor for receiving power in a wired manner or a Wireless Power Receiver for receiving power in a wireless manner.

The GUI may used to facilitate the day to day operation tasks associated with running a mission critical facility (e.g., a power plant) to reduce downtime, streamline benchmarking, enable data collection, and analysis.

Embodiments of the invention may provide several tools for data collection, data trending, data visualization, document management, and interactive operational procedures including Standard Operating Procedures (SOPs), Emergency Action Procedures (EAPs), Emergency Operating Procedures (EOPs), Maintenance Procedures (MPs), Method of Procedures (MOPs) and other facility documentation. An SOP may include best practice approaches or a set of step-by-step instructions for the day-to-day operation of the equipment. An EAP may include step by step actions which must be done in case of an emergency. For example, an EAP could include a backup plan to aid facility management act swiftly and appropriately to determine/assess/solve the problem and prevent future occurrences of the same problem. An EOP may be designed to alleviate guess work and confusion by establishing a systematic approach for responding to emergencies. The EOP may provide instructions and guidelines for addressing a crisis or natural disasters that may occur. An MP may include guidelines for maintenance to be performed on a specific equipment or system. An MOP may include step-by-step procedures and conditions, including responsible personnel who should be contacted or be present, documentation, etc.

Figure 2:
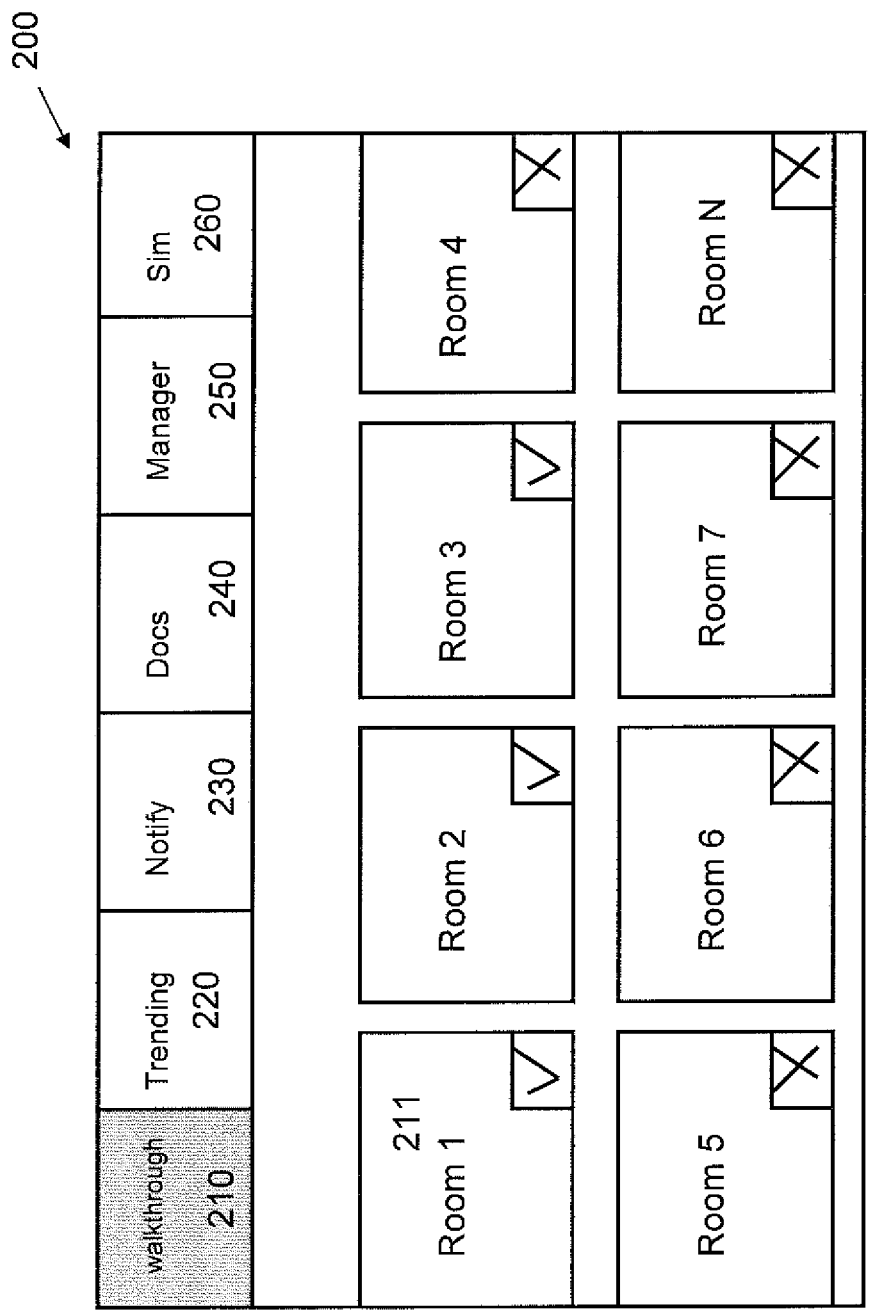
FIG. 2 illustrates an exemplary screen for a walkthrough function of a graphical user interface (GUI) of the system.

FIG. 2 illustrates an example of the GUI 200. Referring to FIG. 2, the GUI 200 includes a walkthrough mode 201 that is selected to enable the user to configure their facility into separate rooms. Each of the rooms may be represented by selectable room buttons 211. When the user selects one of the room buttons 211, the electrical and mechanical apparatuses that are associated with the selected room will appear (see FIG. 3). Each room button 211 may provide a graphical indicator indicating whether the room has already been configured (e.g., a check) or has yet to be configured (e.g., an 'x' or a blank box). However, the invention is not limited thereto. For example, the graphical indicators illustrated in FIG. 2 are merely examples, as other graphical symbols or text may used to convey the same information. The user may also upload facility floor layout plans to be used for navigation of this screen. The user may configure areas of the floor layout plan to correspond to rooms within the system. Selecting the room from this view will display the electrical and mechanical apparatuses as previously described.

Selection on one of the available room buttons 211 brings up a new interface screen that enables the user to enter a new piece of equipment that is housed within the corresponding room, or view/edit equipment that was previously entered (e.g., either manually or automatically). Further, one more of the equipment in the rooms may be pre-loaded automatically using default equipment templates or site templates. The default equipment template may used by the GUI 200 to provide the user with a list of available equipment. Custom equipment fields may also be created by the user and/or added to the default equipment template. In this way, each room may be configured to accommodate a unique equipment setup (e.g., UPS, PTS, switchgear, generator, power distribution unit PDU, boiler, chiller, etc.).

Figure 3:
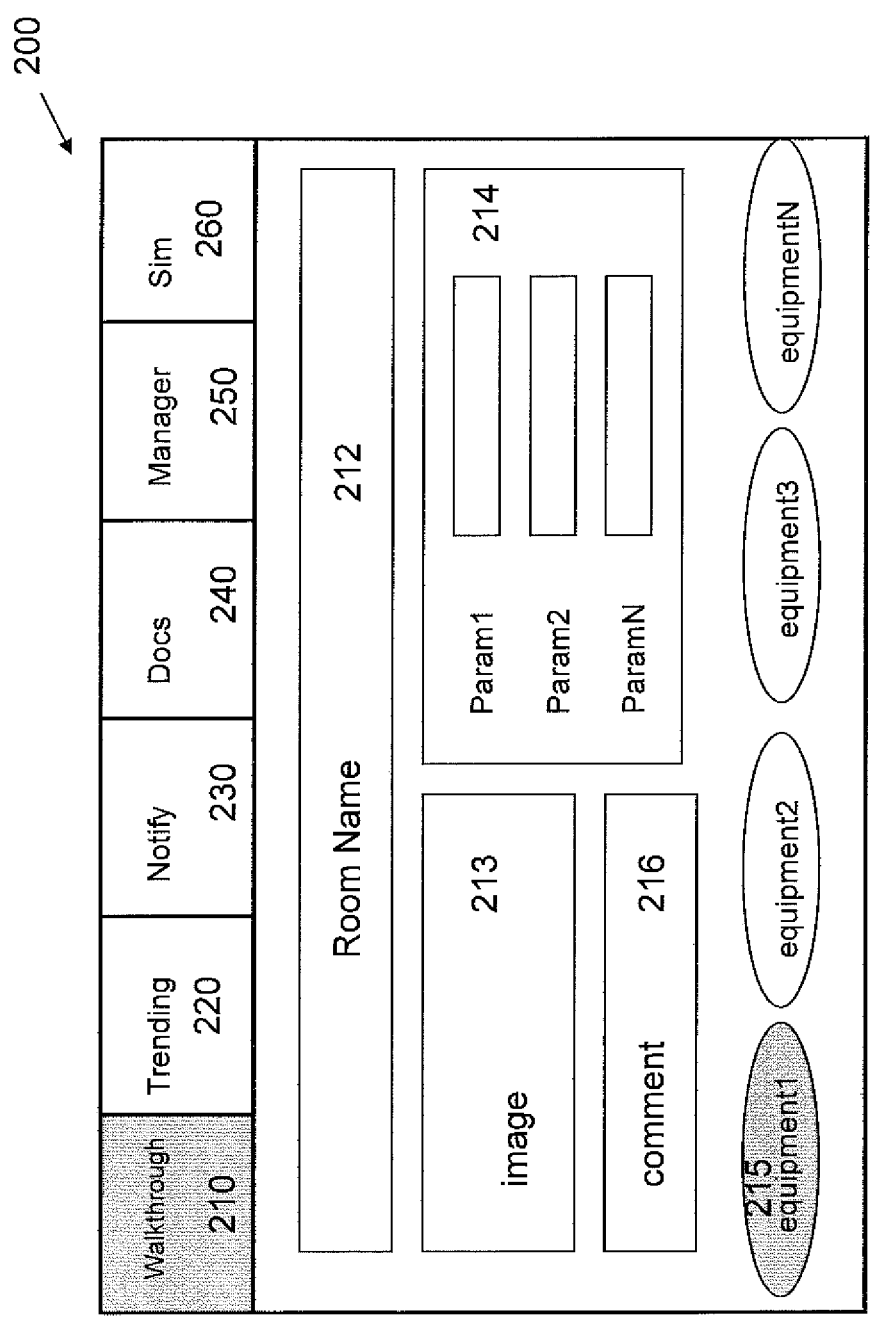
FIG. 3 illustrates another exemplary screen for the walkthrough function.

FIG. 3 illustrates an exemplary screen of the GUI 200 when the walkthrough mode 210 is selected. This screen enables a user to be guided through a facility walkthrough room by room, clearly indicating data values that may be recorded for each piece of equipment. In the example shown in FIG. 3, the screen includes the name of the room 212, an image 213 of the selected equipment or the room, a data entry pane 214, and buttons 215 for selecting one of the available equipment in the room.

The image 213 and the room name 212 are optional. The buttons 215 may include labels that identify the corresponding equipment, which can be revised as necessary by the user. When the mobile system 100 includes a camera, the image 213 may be captured using the camera. The room name 212 field may edited by the user to identify the room.

The data entry pane 214 includes one or more parameters and data entry fields corresponding to the parameters associated with the selected equipment. For example, the parameters and corresponding data entry fields for a UPS could include its current battery voltages, currents, power levels, power quality, temperatures, statuses, alarms, etc. In an exemplary embodiment of the invention, the data fields can be one of various field types, such as numeric (e.g., integer or decimal), a text string, an array of choices, or a checkbox. The text string may be input via a keyboard interfaced with the input/output subsystem 150 or a touch screen of the display subsystem 120. For example, the array of choices may be a selectable list box or dropdown menu with selectable items. Each item may be associated with or return a unique integer value when selected that corresponds to an index into an array that stores the items of the list/menu. The data field may also be a label with one or more selectable arrow buttons that allow the user to increment or decrement the value on the label by a predefined amount. Selection on the checkbox may be stored as an integer representing whether the checkbox has been checked (e.g. 1) or unchecked (e.g., 0).

The application may maintain a data structure or object that corresponds to a single piece of equipment, which may comprise one or more of the above-described data fields. The equipment object may include data regarding its name, type, image file location, its collection of fields, and a collection of document references. When an object is used, it may include access methods (e.g., object methods) that can be called by the system to set its data and read its data.

The name may be a string representation of the name of the equipment (e.g., "Ferro-Resonant UPS", "Line-Interactive UPS", etc.)

The image file location is the string representation of an absolute or relative file path of the image file (e.g., a .png, a .jpg) that visually describes the equipment, which may have been captured by a camera of the system 100. The collection of fields is a collection of field objects that pertains to the equipment. Likewise, the collection of documents is a collection of strings that point to the absolute or relative file path of the documentation files that describe the structure, use, properties, or maintenance of the specific equipment.

Both fields and equipment may be used as collections within a facility room, which the system can maintain using a room object. Room objects are like the equipment objects in that they have data regarding the name, image file location, a collection of fields, and a collection of documents for the particular room. Room objects may also have a collection of equipment, as mentioned previously, which is literally a collection of equipment objects whose data collection interfaces are spatially located within that room area. In addition, room objects may have data pertaining to its representation in the walkthrough data collection. For example, a room object may include a flag that indicates whether or not the room is required to be checked during a specific scheduled walkthrough, as well as data denoting the percentage of fields within the room and the fields within the equipment of the room that may have been completed (whether problematic or not) over all the fields within the room and its equipment.

Fields, equipment, and rooms may be used as collections within a facility floor, which the system 100 can maintain using a floor object. A floor is a specific dimension of facility space that separates the total collection of facility rooms into smaller collections. Each floor object may have a name and an image file location for a picture representing that floor. Floors are not only limited to different floors within the facility building itself, but also include rooftop and outside areas of a facility.

Fields, equipment, rooms, and floors may be used as collections within a facility, which the system 100 can maintain using a facility object. The facility object itself may have a name, address, image file location, a collection of all its floor objects, and a collection of all the actual document objects pertaining to the entire facility. All of the rooms and equipment may have a reference to the facility's master list of documents in order to link themselves to a specific document or collection of documents.

The data entered into the fields may be stored in database in a memory of the system 100 (e.g., 160) and/or in remote database. When a session is saved to the database, every room within the facility may be stored as a database table. A time stamp may be applied to each and every walkthrough session. Each record in that table may contain as columns every single field from that room and its equipment, as well as the time stamp of the walkthrough session. Every time a walkthrough session is saved, it may either overwrite the latest record within the table, or insert a new record into the table. If the current session being saved is a new session, it may insert a new record, but if it is a continued session that was previously saved it may overwrite the last record saved.

When the application is started, it may first retrieve the stored object-oriented data from the device memory, which may be encoded. The encoded data for the facility and its floors, rooms, equipment, fields and documents may be decoded and recreated at runtime, after a user attempting to login to the application has been authenticated. Afterwards, if any synchronization to a remote database is to be made, the last record from each table in the local database (e.g., each table may refer to a specific room within the facility) may update the values of all the fields within the facility's field objects. Also, as far as data analysis is concerned, an entire set of records across multiple timestamp ranges may be imported into the application from the remote database for the sake of viewing, analyzing, and reporting trends throughout time across equipment and fields.

Data from a record set may be collected as an array of arrays (a two-dimensional array). In an exemplary embodiment, the first position of the two-dimensional array refers to the index of the record retrieved, uniquely identified by its timestamp, while the second position of the two-dimensional array refers to the column of the record retrieved. An embodiment of the application may point to and retrieve a specific data field collected from any time. In an exemplary embodiment, multiple record sets are obtained, one for each database table (e.g., one for each room), which a user may choose any collected data field from any time as far as the database record set allows.

The system 100 may compare the entered parameter data against stored thresholds or previously entered data to determine whether an error has occurred. The thresholds may include a Maximum Threshold and a Precise Threshold.

Data fields that conform to the Maximum Threshold may not exceed the nominal value (Xnominal). Warnings may be displayed on the GUI 200 when the data (Xactual) falls outside a tolerance value (T %) as shown by the following Equation 1:

$$X\text{actual} > X\text{nomimal} - (X\text{nominal} * T\%) \tag{1}$$

For example, if the tolerance value is 10%, the actual temperature of a boiler is 200 degrees, and the nominal value is 250 degrees, since an actual of 200 is not above 250−(250*0.1) (i.e., 200 is not above 225), no warning would be displayed. However, if the temperature had risen to 226 degrees in this example, a warning would have been displayed.

The system 100 may also, or instead, average the previous logged data/parameter with the current entered parameter data, and compare this average value with a corresponding threshold to determine if a warning should be displayed. For example, if the current boiler temperature was entered at 226 degrees, but the prior 4 samples have the temperature at 200 degrees, since the overall average temperature is between is less than 226, no warning would be displayed. The amount of samples used for this averaging may vary and be a configurable parameter.

Data fields that conform to the Precise Threshold must not rise above or fall below the nominal value by more than the tolerance value. The GUI 200 may display a warning when data is outside of the tolerance as shown by the following Equation 2:

$$X\text{actual} > X\text{nominal} + X\text{nominal} * T\% \text{ AND}$$
$$X\text{actual} < X\text{nominal} - X\text{nominal} * T\% \tag{2}$$

If the value of the data field is beyond the threshold, then the value of the field is out of range and the system may alert the user. For example, if the tolerance value is 10%, the actual temperature of the boiler is 100 degrees, and the nominal value is 140 degrees, a warning would be displayed because an actual of 100 is less than 140−140*0.1 (e.g., 100 is less than 140−14). However, if the boiler temperature rises to 150 degrees a warning would not be displayed since it lower than 140+140*0.1.

If it has been determined that a warning is to be displayed, the system 100 may notify the user to take corrective action to maintain the equipment before a failure occurs. The notification may appear as a visual on the GUI 200 or as audible alert. For example, parameter data for equipment that is outside of the threshold limits may be marked with visual cues. Further, different levels of alerts may be present. For example, a low level alert may become an elevated alert if new data is entered outside of a user configurable normal tolerance threshold. Since the error may have been caused by a data entry error, the user can choose to commit the data with the value as is, or edit the data before it is committed.

The notifications may be managed by selecting the notify tab 230. For example, the interface 200 enables the user to indicate who should be contacted, the form used for the contact (e.g., SMS text message, e-mail, social network message, etc.). For example, in addition to presenting the user of the system 100 with a visual or audible notification, the system 100 can notify the site administrator via an automatically generated email, text message, social network message, etc.

The user may record comments in the comment field 216 for each room for each piece of equipment within the room. When the camera is present, it may be used to record one or more pictures that are automatically associated with the comment. The comments and associated pictures may be stored on a database of the system 100 or a remote database. For example, if the user notices that the temperature of the boiler is too high, he can provide a corresponding comment and snap a photo of the instrument panel of the boiler showing the elevated temperature.

Once sufficient data has been captured by the system 100, the user may select the trending mode 220 to access a visual representation of all data. In this visual representation, each data field may be graphed against its threshold limits and an estimated prediction trend line may be illustrated to show if and when the thresholds may be exceeded.

Analysis of the data may reveal opportunities for the user to take corrective action to maintain equipment before a failure occurs. The trending may identify spikes and dips in recorded data as anomalies. The anomalies may be used as a basis of analysis where related data fields are analyzed for anomalies occurring during the same time period. Correlation between anomalies occurring during the same time period may provide a basis for corrective actions to locate and address the issue.

The system 100 may trend data input by the user during a walkthrough data collection session. The data trending activity fragment may first retrieve historic data from the device database up to a specified range of time defined by the user, by means of the data retrieval mechanism detailed previously. The data trending activity fragment may then calculate the positive and negative slopes of the sinusoidal curves that were created by the obtained information. The data trending activity fragment may be able to calculate transients (voltage spikes, current spikes, brownouts) by using the trends generated by the data collected. If such problematic transients are implied by the generated trends, the data trending feature may pinpoint the equipment or location of the issue within the facility.

The trending mode 220 may also be used to generate a report of the collected data stating a brief analysis of said trends or anomalies, and may also include a printout of the data the selected fields in graphical and tabular format.

Figure 4:
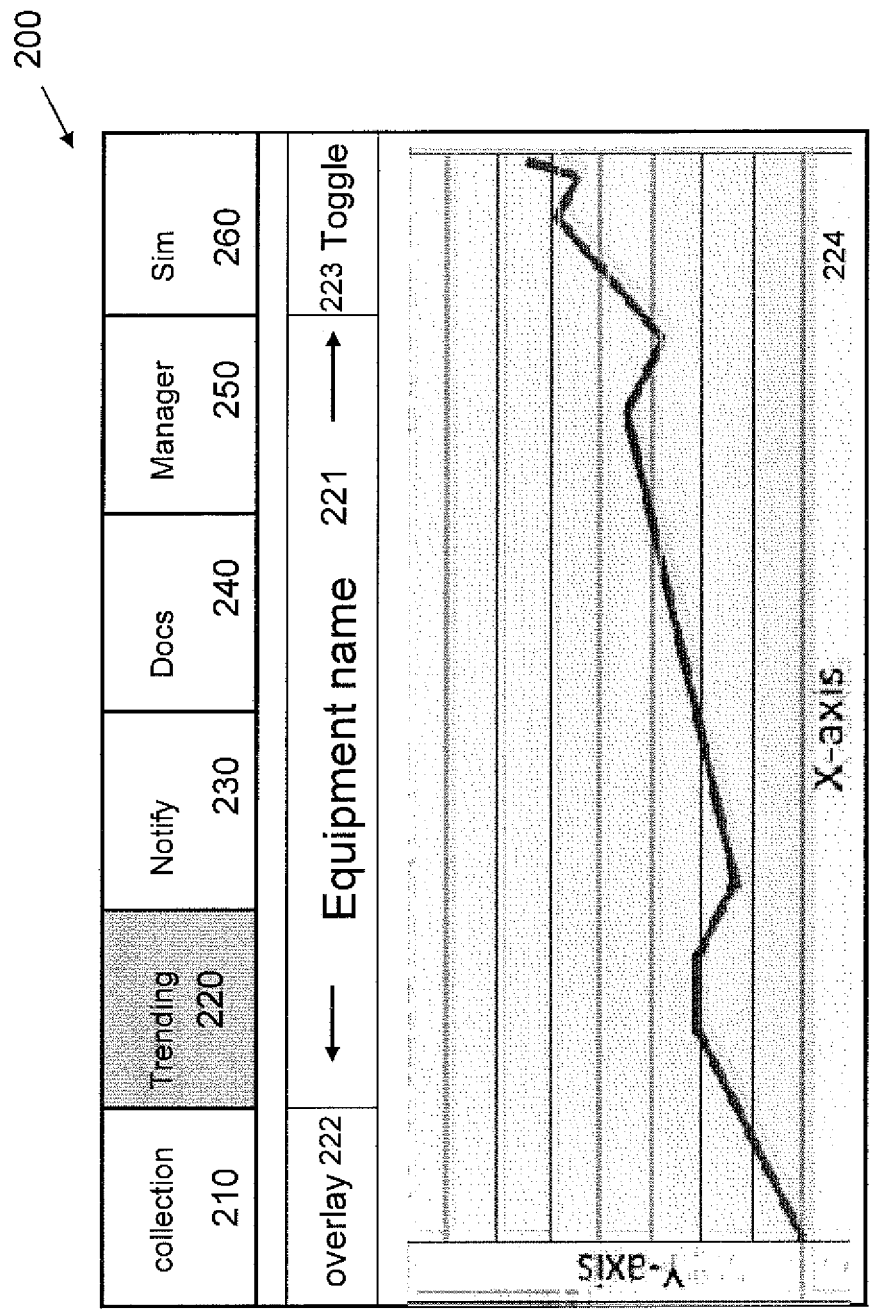
FIG. 4 illustrates an exemplary screen for a trending function of the GUI.

As shown in FIG. 4, interface displayed by selecting the trending mode 220 may include an equipment label 221 identifying the equipment, an overlay button 222, and a toggle button 223. The arrows to the left and right of the equipment name 221 may be used to advance to a preceding or subsequent piece of equipment in the room. The trending mode 220 interface may also enable the user to specify equipment data fields and date ranges to be displayed on the graph for comparison of past and present data. The toggle button 223 can be used to toggle the view of the data between the graphical view and a tabular view.

Figure 5:
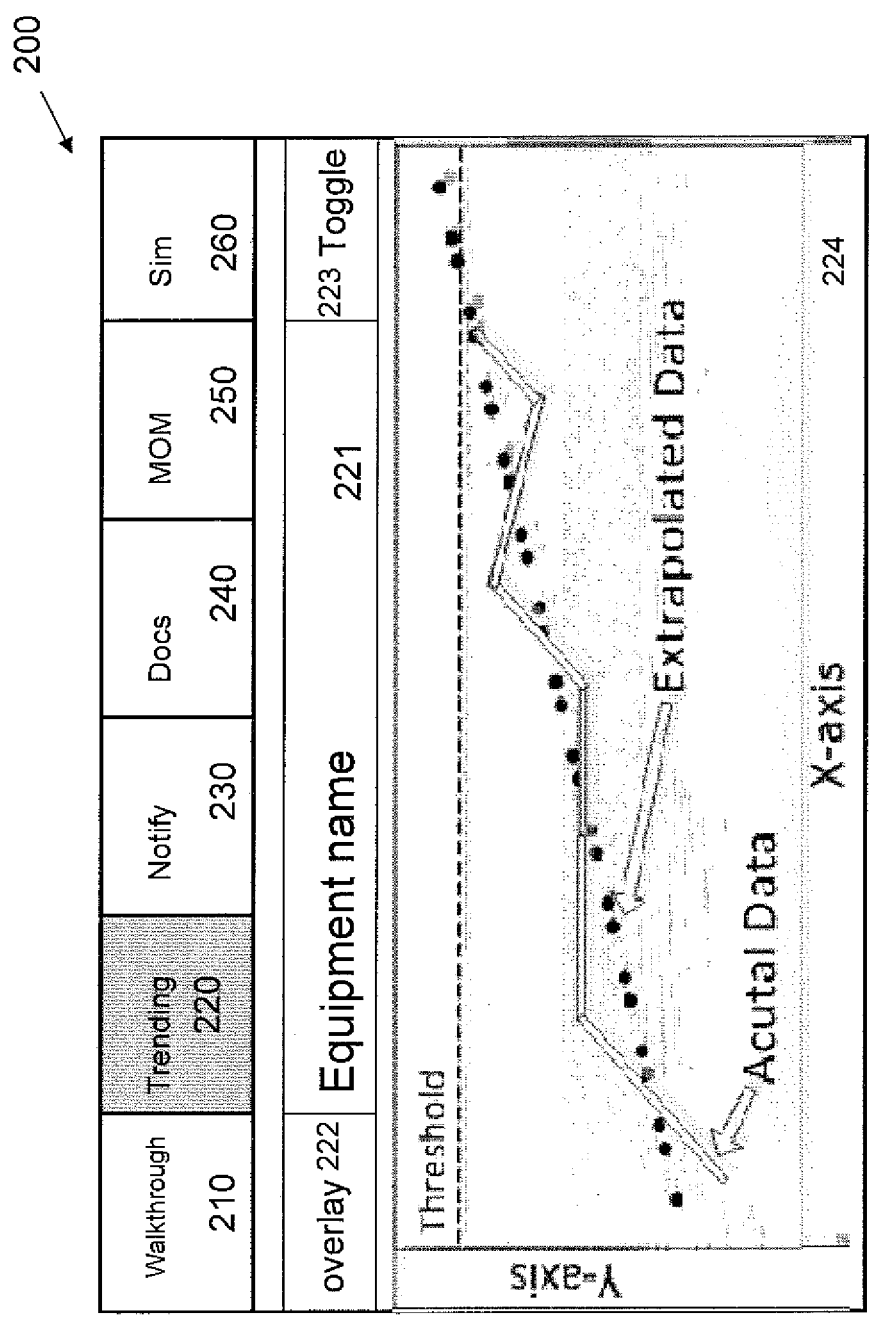
FIG. 5 illustrates another exemplary screen for the trending function.

The overlay button 222 can be used to view an overlay of projected equipment loading values to identify trends in data that was collected, as shown in FIG. 5. As an example, the graph 224 can display one data parameter of a piece of equipment over time, and against the threshold or capacity limits, and an estimated (e.g., extrapolated) trend line will show if and when the thresholds may be exceeded. This information may aid the user in identifying system capacity trends as new equipment is added to the facility. The user may select equipment data fields to be displayed and analyzed on the data trending graphs. These graphs may be overlaid on the same set of axes for data comparison. The interface 200 may highlight increasing and decreasing trends for the user.

The system 100 may be configured to generate reports of the collected data, a brief analysis, and an overview of the data that was entered for selected fields. The system 100 may enable the user to generate a full report based on the entered data.

The document mode 240 can be selected to access one or more documents such as SOPs, EAPs, EOPs, MPs, MOPs, drawings, schematics, or other relevant documentation associated with equipment in the corresponding room or the facility. These documents may be accessed in a "step by step" mode of the interface 200 on a display of the display subsystem 120 that guides the user through each step in a procedure of a corresponding one of the documents. For example, text of the steps that have been completed and the subsequent steps can be displayed on the display, where the next step to be completed can be emphasized (e.g., highlighted in a different color, underlined, etc.). The interface 200 may enable the user to mark each step as complete. For example, the interface 200 may provide a check box next to each step that can be selected when the user has finished that part of the procedure. The user may also be notified if a step has been skipped. The "step by step" mode may reduce confusion during an emergency by guiding the user in a high stress environment, which may also increase safety.

The user may also access electrical and mechanical one-line diagrams and other various important operational drawings including floor layouts, etc. These documents may also be used to facilitate practice simulations that may reduce risk and improve life safety.

The MOM mode 250 may be selected to provide personnel with immediate access to important facility drawings (e.g., electrical one line diagrams, floor plans, and mechanical drawings, etc.), emergency operating procedures, and other pertinent information to keep operations running smoothly. This MOM mode 250 is not limited to providing emergency related information, as it may also provide pertinent information on switching procedures, technical maintenance programs, and other operations procedures, facility one lines, and other facility infrastructure drawings including SOPs, EAPs, EOPs, MPs, MOPs, etc. Further, other documentation may be imported from a remote server and saved into the application locally, which allows use of the data without network connectivity.

The Simulation mode 260 may be selected to simulate one or more functions of the system 100. Selection of the simulation mode 260 may present a screen that enables a trainee to run one or more available training scenarios or a site administrator to create the training scenarios. As an example, the training scenarios may used to teach the trainee how to use the system 100 or to simulate conditions that would be predicted to occur based on data entered by a user. For example, a training scenario could be walkthrough of a room full of several pieces of equipment in a room, where the trainee is expected to enter parameter data (e.g., boiler temperature, battery voltage, etc.) for each corresponding piece. If the trainee enters parameter data that is outside of expected thresholds, they would receive an alert that is similar to the actual one that would have been received during normal operation. However, since this is merely a simulation, the site administrator would not receive a notification (e.g., e-mail, text, etc.) of the alert.

Figure 6:
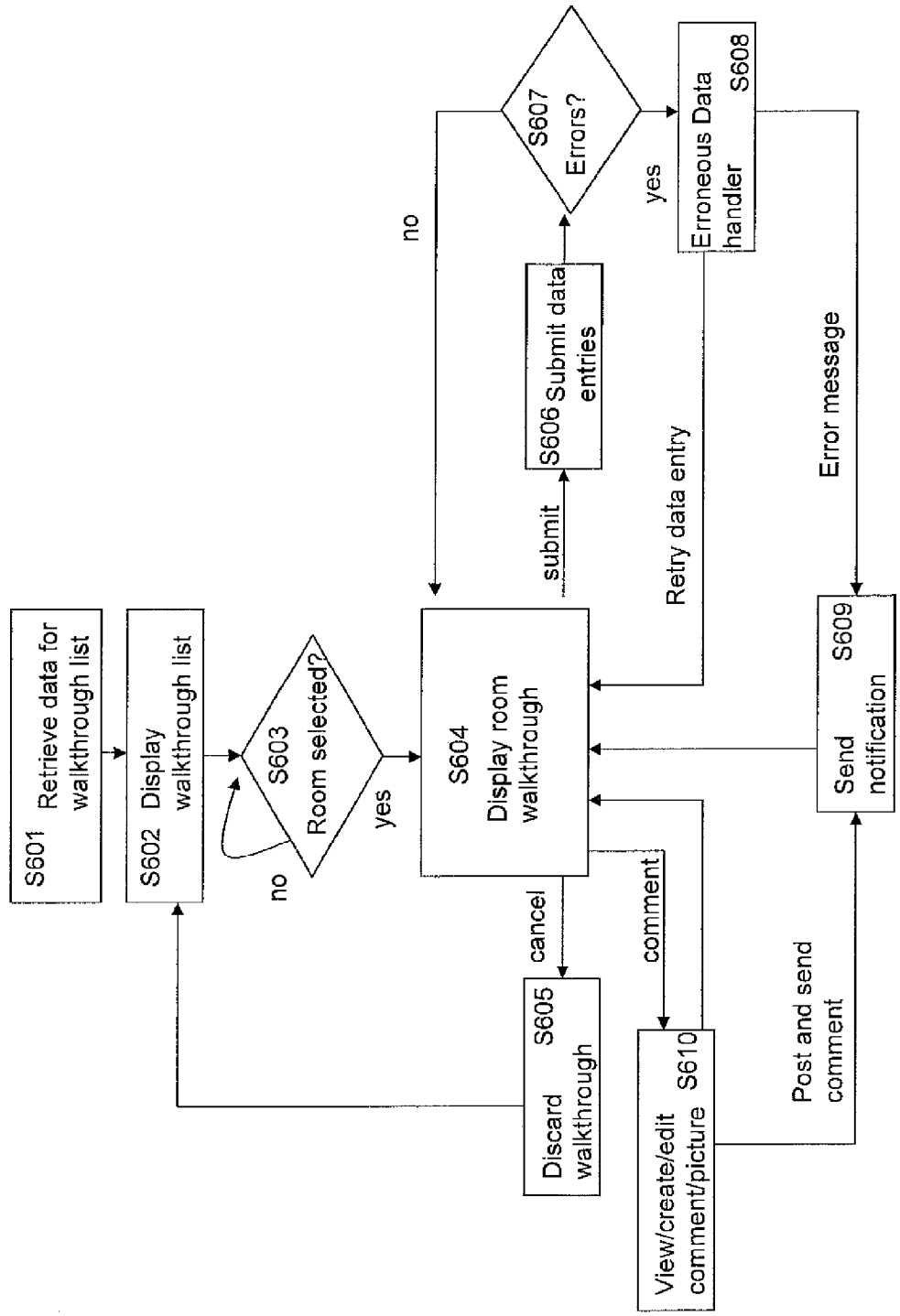
FIG. 6 illustrates a data flow based on use of the walkthrough function according to an exemplary embodiment of the invention.

FIG. 6 illustrates a flowchart that explains a data flow due to selection of the walkthrough mode 210 according to an exemplary embodiment of the invention. Referring to FIG. 6, data for a walkthrough list is retrieved from a database (S601) and displayed on the interface 200 (S602). The displayed walkthrough list may include the list of rooms that are available, which as an example, could be selectable buttons (see 211 of FIG. 2). An event handler may be running in the background to determine whether the user has selected one of the room buttons (S603). Once a room has been selected, it may be displayed by the interface 200 along with data entry fields and various choices, such as cancel, submit, comment, etc. (S604).

If the cancel choice is selected, the current walkthrough of the room is discarded (S605), and the method returns to the display of the initial walkthrough list (S602) so the user can select a different room.

Once the user has entered the required data into the data entry fields (e.g., current temperature of boiler, current voltage of UPS, etc.) for a piece of equipment of the room, and the user selects the submit choice, submission handler operates on the submitted data (S606).

The submission handler determines whether there are errors in the data (S607). If there are no errors, the method returns to the displayed room to enable the user to enter data for another piece of equipment in the room (S603). Data that is entered without an error may be parameter data entered within established threshold ranges or values for the corresponding equipment. If the data is outside of the threshold range or of an invalid format (e.g., letters entered where numbers expected), an erroneous data handler operates on the data to determine the type of error (S608). The erroneous data handler can give the user an opportunity to correct the data or can immediately send a corresponding error message to a notification handler. When the erroneous data handler gives the user a chance to correct the data, it can cause the interface to display an indication to the user that parameter data for the data entry field of the equipment is in an improper format or is outside the acceptable range or threshold. If the user re-submits the same data, the erroneous data handler can then automatically send out the error message to the notification handler. The notification handler may be configured to send (e.g., via e-mail, text, social network, etc.) the error message to one or more responsible parties (S609).

During the data entry of the equipment, the user can use a comment choice to enter personal comments on the equipment, and/or capture a picture of the equipment that can be sent to the notification handler for forwarding to the one or more responsible parties (S610). The user can enter the comments/pictures without having the notification handler automatically forward them. However, if an error is later encountered due to entry of parameter data for the equipment, the notification handler can include these comments/pictures along with the error message it receives from the erroneous data handler in a notification it sends to the responsible party.

Figure 7:
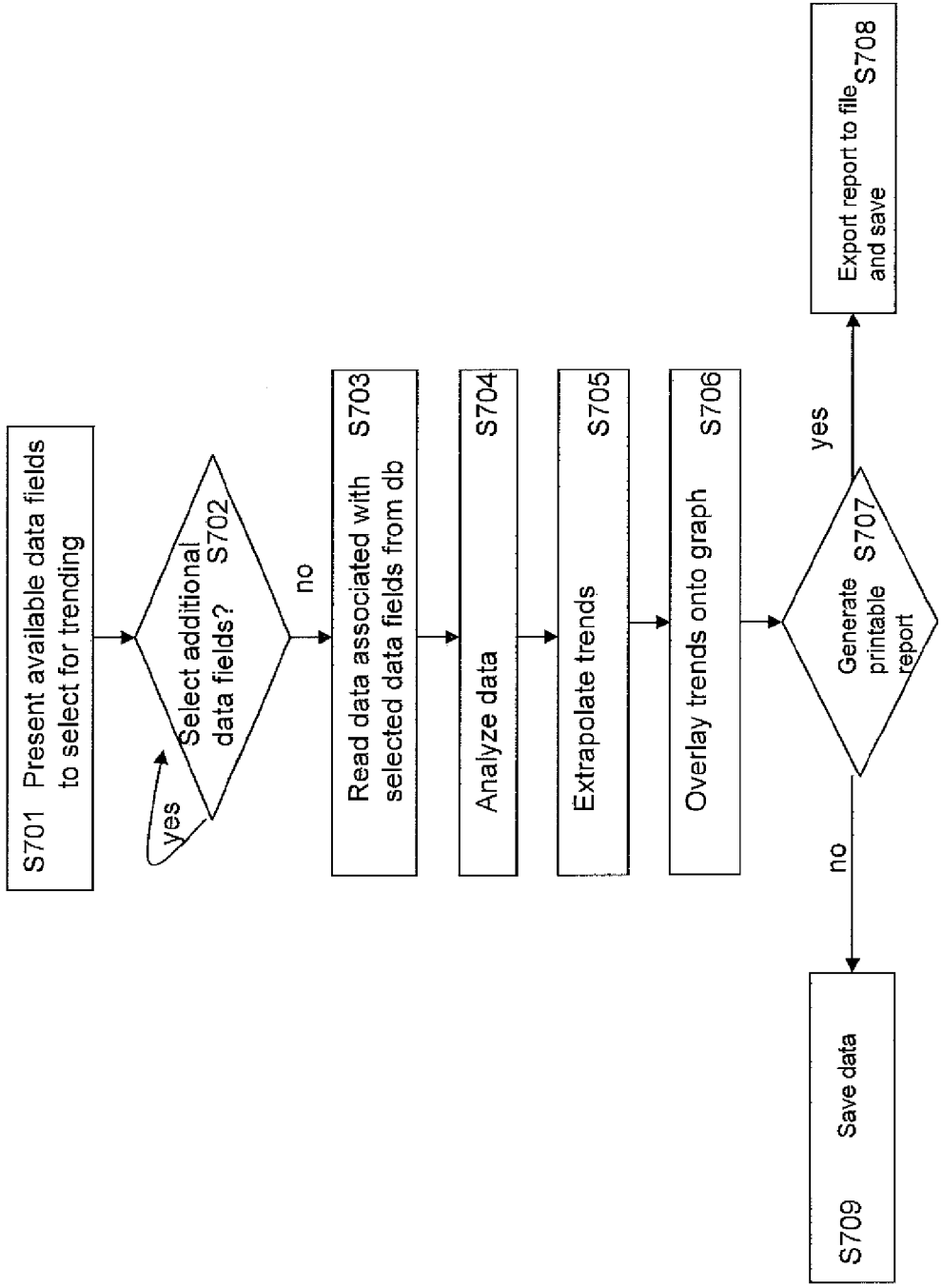
FIG. 7 illustrates a data flow based on use of the trending function according to an exemplary embodiment of the invention.

FIG. 7 illustrates a flowchart that explains a data flow due to selection of the data trending mode 220 according to an exemplary embodiment of the invention. Referring to FIG. 7, the interface presents 200 to the user the available data fields (e.g., temperature of boiler1 over time) that can be selected for a piece of equipment for trending (S701). The interface 200 may include an choice that enables to the user to select one or more additional data fields to trend (e.g., temperature of boiler2) and overlay against the previously selected data fields to trend (S702). If no additional fields are selected or the user wants to just wants to trend the one selected data field, the data associated with the selected data fields is read/loaded from a database (S703). The application then analyzes the data (S704). This data analysis may include identification of anomaly points within each data set, including abnormal spikes and valleys detected in the data, as well as points where the data has exceeded its thresholds. In addition, each data set's anomalies can be compared to another data set's anomalies in the system 100 to identify anomalies within corresponding time periods. These comparisons may then be displayed to the user where they may be correlated with regional data such as weather, temperature, and humidity data, or other third party data sources over the time periods of each anomaly.

The application may also perform an extrapolation on the data on to predict the future values of the data for the equipment (S704). For example, if the power of the UPS has been steadily decreasing by 5% every hour, and the UPS is currently at 50%, the application could predict that the UPS will be at 45% power in the next hour. The application can present the data for one of the selected data fields onto a graph, and also overlay this with the data of the other selected data fields (S706). The interface 200 enables a user to generate a printable report (707) and export to a file (e.g., a pdf) that is saved (S708) or to merely save the data (S709). Once the user is done viewing the trended data, the interface 200 enables the user to start a new data trending session (S701).

Figure 8:
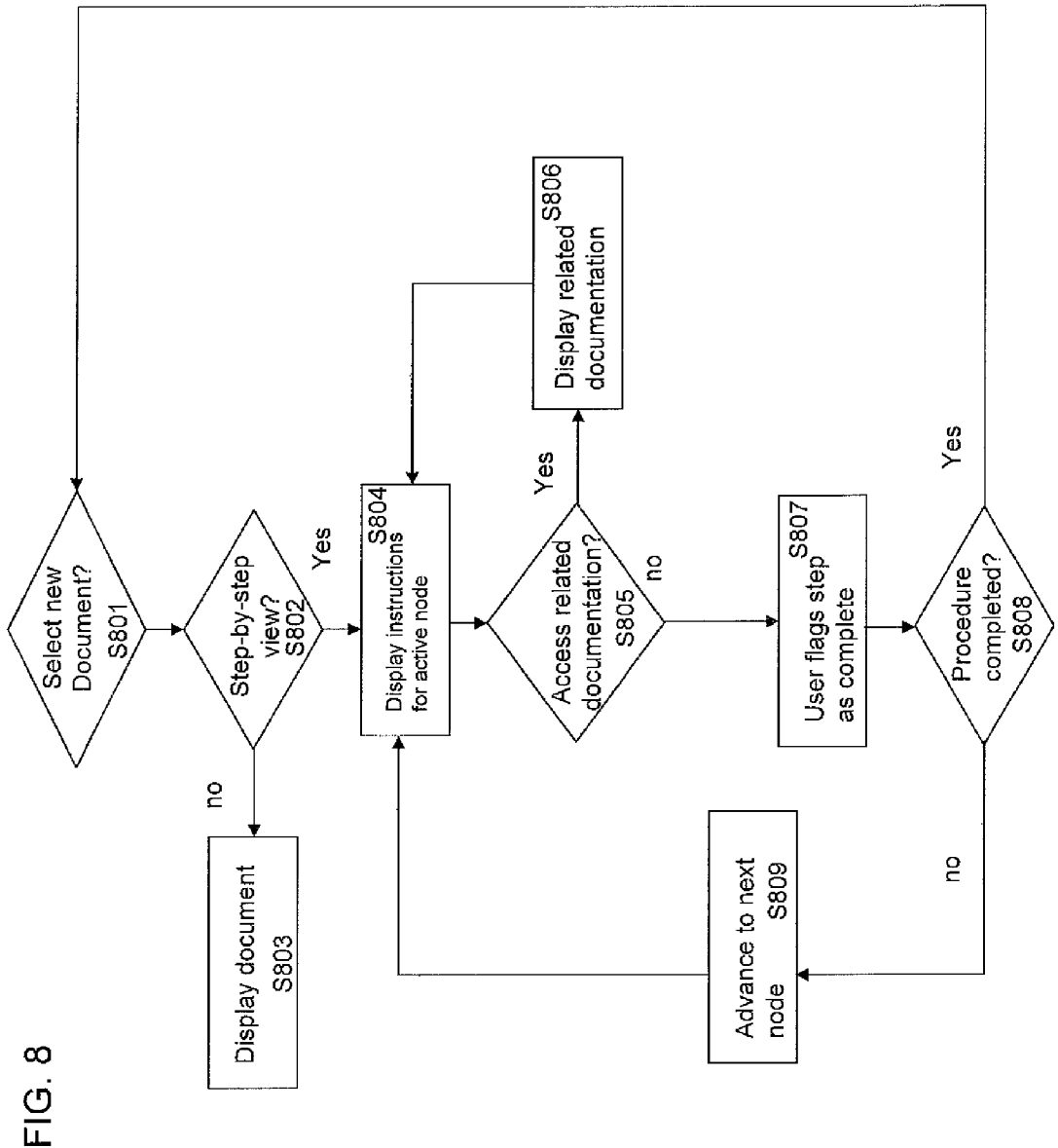
FIG. 8 illustrates a data flow based on use of an operations manager function of the GUI according to an exemplary embodiment of the invention.

FIG. 8 illustrates a flowchart that explains a data flow due to selection of the MOM mode 250 according to an exemplary embodiment of the invention. Referring to FIG. 8, the interface 200 enables the user (e.g., via an event handler) to select a new document for subsequent viewing (S801). Next, the interface 200 enables the user to view the document in a step-by-step view (e.g., smartmode). If the user decides they do not want the step-by-step view, the interface 200 presents the user with the document (S803). If the user decides they want the step-by-step view, instructions for a single step or paragraph of the document are presented to the user (S804). The interface may include a handler to determine whether the user needs additional information to complete the step (S805). For example, the interface 200 may include a selectable choice that is monitored by the handler to determine whether the user wants access to the procedure documentation related to the current step of the procedure. For example, if the user selects this choice, the interface 200 can present the document to the user (S806). If the user does not require access to the document or has already reviewed the document, after performing one step of the procedure (e.g., restarting the UPS, hitting the boiler reset, etc.), the user indicates to the interface that the step has been completed (S807). For example, the step displayed on the interface 200 may include a selectable checkbox that is selected by the user to indicate the step has been completed. The application can automatically determine whether the procedure has been completed (S808). For example, if the procedure has 4 steps, and all 4 steps were checked by the user, the application may assume that the procedure was completed, and may return to an initial state to enable the user to select a new document (S801). If the procedure has not been completed, the application advances to the next step of the procedure (S809) and displays the set of instructions for the next step (S804).

The interface 200 enables a user to import procedures into the system and configure the step-by-step view (smart mode) for the corresponding document. The step-by-step view may include detailed instructions including what to do, a brief description, and expected results. The smart mode may also be integrated with a simulation training module, which may be launched using the simulation mode 260.

Special document types that are procedure-enabled may allow users to view each step in a procedure, as well as its supplemental information. A document procedure may be generated based off of existing document text for standard, maintenance, and emergency operation procedures. Each step may become its own node within the procedure-enabled documentation. Additionally, each node may be modified to best represent the facility's needs, by users who have managerial or administrative access. All changes to the nodes themselves may be logged by timestamps and the user identification of the manager or administrator who modified it.

A node may be placed within an array that is indexed based on its step number, and can link to an array of image file strings as well as a list of text strings to be included as extra information to aid with the step completion process. The system 100 may iterate through the arrays based on user interaction. Once a step is completed, the present invention may show the next step is readily available. Visual notifications may be displayed as steps are completed.

The database may log the user, begin and end timestamps and completion information for each procedure they may have to go through. The database may log user activity on the interface 200, which may be accessed by privileged users, such as an administrator or a manager. Each smart procedure may also link its nodes to dynamic facility one-line drawings. As steps are completed, the drawings will update to visually represent the changes made to the system.

The system 100 may support one-lines, which are special document types that allow for alteration of their visual output based off of user interaction with values and procedures in a 'real-time' virtual environment. Visual aspects of each one-line are graphical objects representing that specific part of the one line. The user may modify equipment states, which may in turn modify the object whose values are linked to the changes made by the user. The object may then have its values changed accordingly. At the time of the next recreation of the one-line representation, each object may be redrawn visually representing the new drawing state. Each graphical object may contain data representing its connection points, nodes, shape, and colors, which are all configurable and alterable through user interaction.

The user may switch between the modes of the interface 200 and the system 100 and save the state of the currently selected mode locally so that when the interface 200 is restarted, the correct mode is displayed.

The application that launches the interface 200 may be represented on the display of the display subsystem 120 by a selectable graphical icon. When the icon is selected, prior to enabling the user access to the functions of the interface 200, the user may be prompted to enter a login name/identifier and a password that corresponds to one or more accounts maintained by the application. The application may support different layers of accounts, where some accounts have access to more features of the interface 200 than others. For example, the administrator may have access to all features whereas a trainee could have access only the simulation mode 260, etc. This layered access may be secured by multiple authorization methods including encrypted passphrases, hardware keys, iris scan, user fingerprint, and facial recognition.

In at least one embodiment of the invention, the system 100 synchronizes all collected data with a centralized, secure database (e.g., encrypted) that may be located on a remote server. For example, updates to data generated on one system 100 may be uploaded to the remote database. The remote database may then update other devices(s) with the updated data. The data may include facility configurations, collected equipment data, facility documentation, document association properties with facility, equipment, and/or rooms, or training simulations.

The remote server or system 100 may also aggregate data from various third party data sources including electrical system metering devices, mechanical system metering devices, facility alarms and alerts, security systems, and weather data. This data may be used for analytics and for basic viewing.

The remote server or database may host a library containing generic manufacturer data, equipment manuals, and other documentation that may be accessed by any of the systems 100.

The systems 100 may communicate with the remote server via a private network where all interactions may be encrypted. The users of the systems 100 may access all information via a locally cached database for locations that do not have network access. For example, if network access is not available, the application will locally cache data on the device's internal storage (e.g., memory 160). Once network access is restored, the application may synchronize the locally stored data with the remote database automatically.

Figure 9:
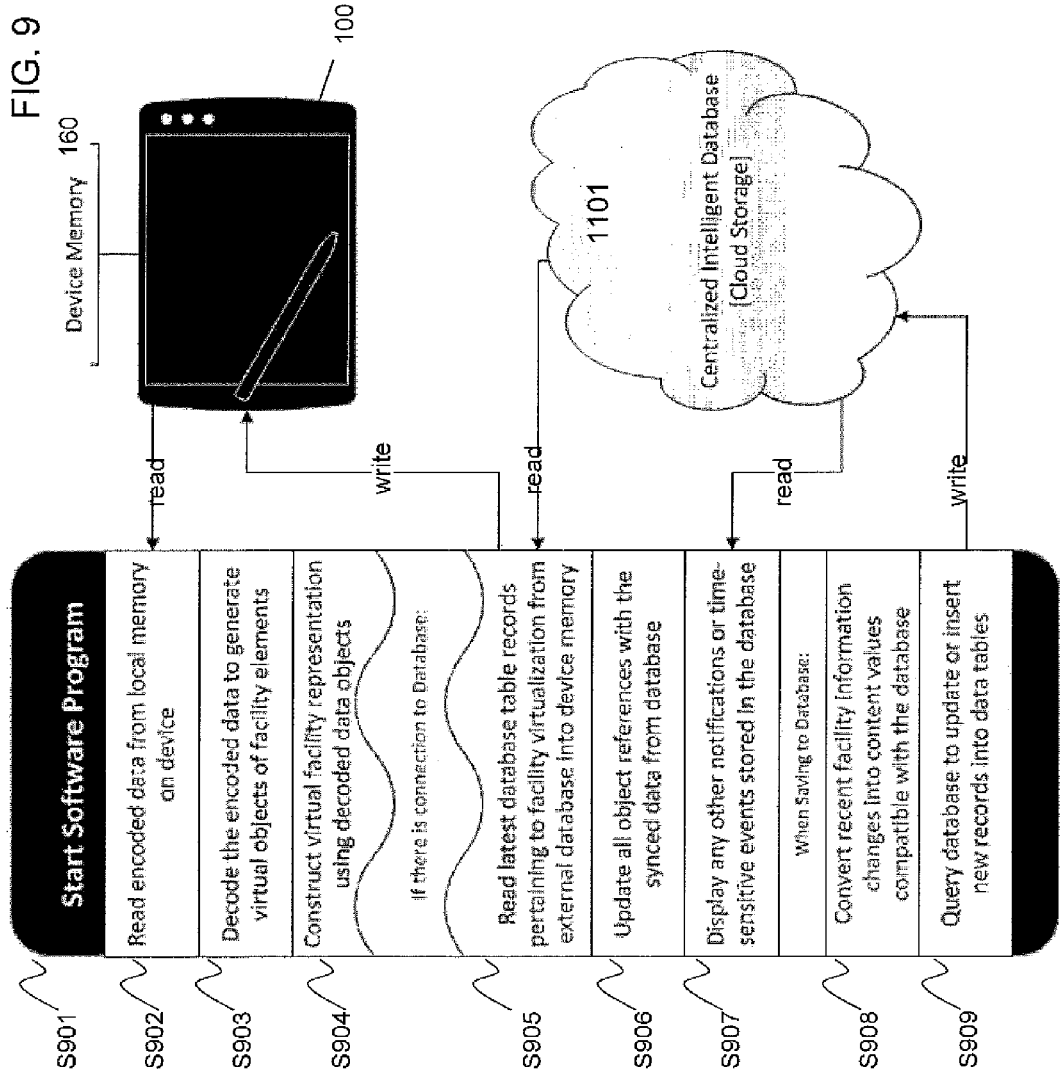
FIG. 9 illustrates exemplary communications between the system and the cloud.

FIG. 9 shows interactions between the system for managing a facility 100 and the remote database 1101, according to an exemplary embodiment of the invention. The database may be located on the cloud. Referring to FIG. 9, the application program is started on the system 100 (S901). For example, an icon may be present on a display of the system 100 that is selected with a stylus or a finger to start the application program that is executed by processor 110.

Next, the application program reads data from local memory (e.g., 160) on the system 100, which may be encoded (S902) and the application program constructs virtual facility representations of the read data using data objects (S903). For example, if the read data includes equipment for different rooms and different floors, the application may create an equipment object for each piece of equipment, room objects for each room, and floor objects for each floor. A room object may link to its associated equipment objects. For example, each object may include an object identifier, and thus a room object that stores several pieces of equipment could store an object identifier for each equipment object it contains. Similarly, a floor object may link to its associated rooms by storing an object identifier for each room object. Similarly, a facility object may be created that links to its associated floors by storing an object identifier for each floor object it contains.

If there is a connection to database 1101, the application reads the latest database table records pertaining to the facility virtualization from the database 1101 into memory 160 (S905), updates all object references with the synced data from the database 1101 (S906), and displays any notifications or time-sensitive events stored in the database (S907).

Saving data entered into the system 100 to the database 1101 may include converting recent facility information changes into context values compatible with the database 1101 (S908) and querying the database to update or insert new records into the corresponding data tables (S909).

Figure 10:
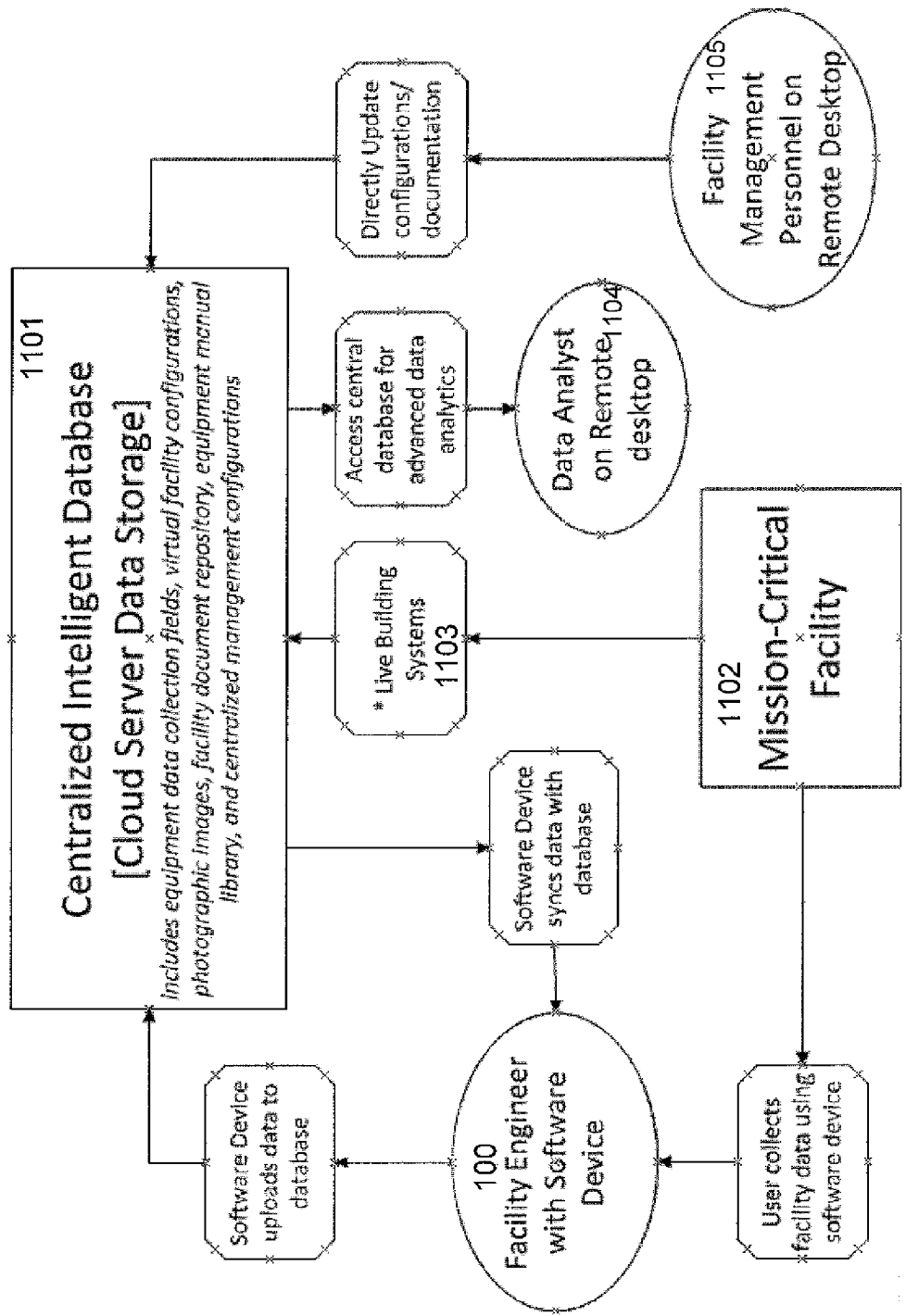
FIG. 10 illustrates a data synchronization model according to an exemplary embodiment of the invention.

FIG. 10 shows a data synchronization model according to an exemplary embodiment of the invention, which shows exemplary interactions between the database 1101, the facility 1102, a live building system 1103, an analyst 1104, facility management personnel 1105, and the system for managing a facility 100.

As shown in FIG. 10, after data is entered by the facility engineer using the system 100 during a walkthrough of the facility 1102, the system 100 may upload the data to the database 1101, and data entered into the database 1101 by other similar systems 100, a live building system 1103, or the facility management personnel 1105 may be sent to one or more of the systems 100, for update of their local databases. The live building system 1103 may include facility management, electrical, mechanical, and surveillance systems. The data analyst 1104 may access (e.g., read or update) the central database 1101 from a remote computer. The facility management personnel 1105 may update the central database 1101 from a remote computer (e.g., with various equipment configurations or documentation).

Figure 11:
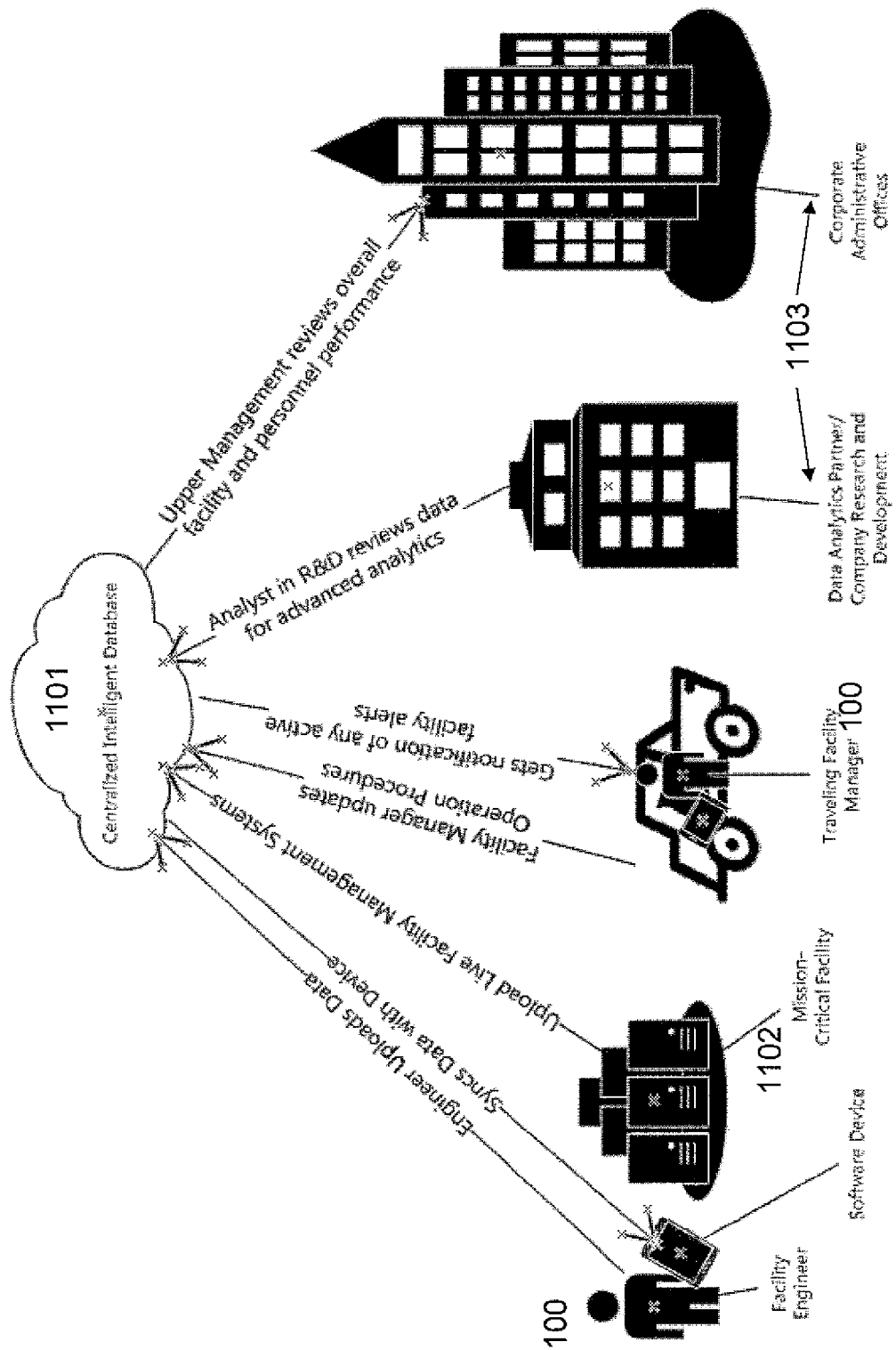
FIG. 11 illustrates an example of the system performing data synchronization.

FIG. 11 shows exemplary communications between the remote database 1101, the systems 100 used by an engineer and a facility manager, the facility itself 1102, and other remote computers 1103.

The application may periodically or on request retrieve a snapshot of data for one or more rooms of the current facility a room of equipment stored in the remote database for local storage. For example, if two users are performing data collection on different rooms/floors of the facility, the periodical or on request retrieval allows the current user to work with the most current up to date data.

The database can be access restricted, and customized by the user such that certain accounts only have access to certain files and documents. Further, the information on the database may be encrypted and password protected. For example, even though an account may have access to the database, it may not have access to all tables of the database or certain data fields. The application may be configured to detect if the device as moved outside of the facility, and erase all locally cached data. The application may also transmit GPS location data so that the user may recover the device.

In an exemplary embodiment of the invention, the application implements three levels of access control. For example, the first level is an administrator level, which has access to all features of the interface 200 (e.g., all modes). This access level allows the user to configure the walkthrough rooms and equipment, perform walkthroughs (e.g., enter parameter data for equipment), view the data trending mode 220, and access all data in the mission critical operations manager (MOM) mode 250. The second level is a facility personnel level, which has access to perform the walkthroughs, select the data trending mode 220, and access the manager mode 220. The third level is a view-only level which has access only to the data trending mode 220.

In an exemplary embodiment of the invention, the system 100 (e.g., via connectivity subsystem 130) utilizes radio signals (e.g., NFC, RFID, etc.) to perform various automated actions. For example, each room and/or equipment may be equipped with an NFC tag to be used as a physical check that personnel have physically entered the room and viewed the equipment. Scanning the tag may also activate the data collection screen for that particular room or equipment. For equipment that is equipped with wireless metering devices, scanning the tag may cause the system 100 to interface with the metering device to automatically download the latest data readings.

In an exemplary embodiment, the system 100 determines that it has entered a particular room when it passes an NFC or RFID tag (e.g., on a doorway of a room or elsewhere in the room), and then automatically loads a walkthrough for that room and its associated equipment. For example, an NFC or RFID tag may be affixed to the room that includes a unique identifier that distinguishes the room from the other rooms in the facility that is read by the system 100.

Figure 12:
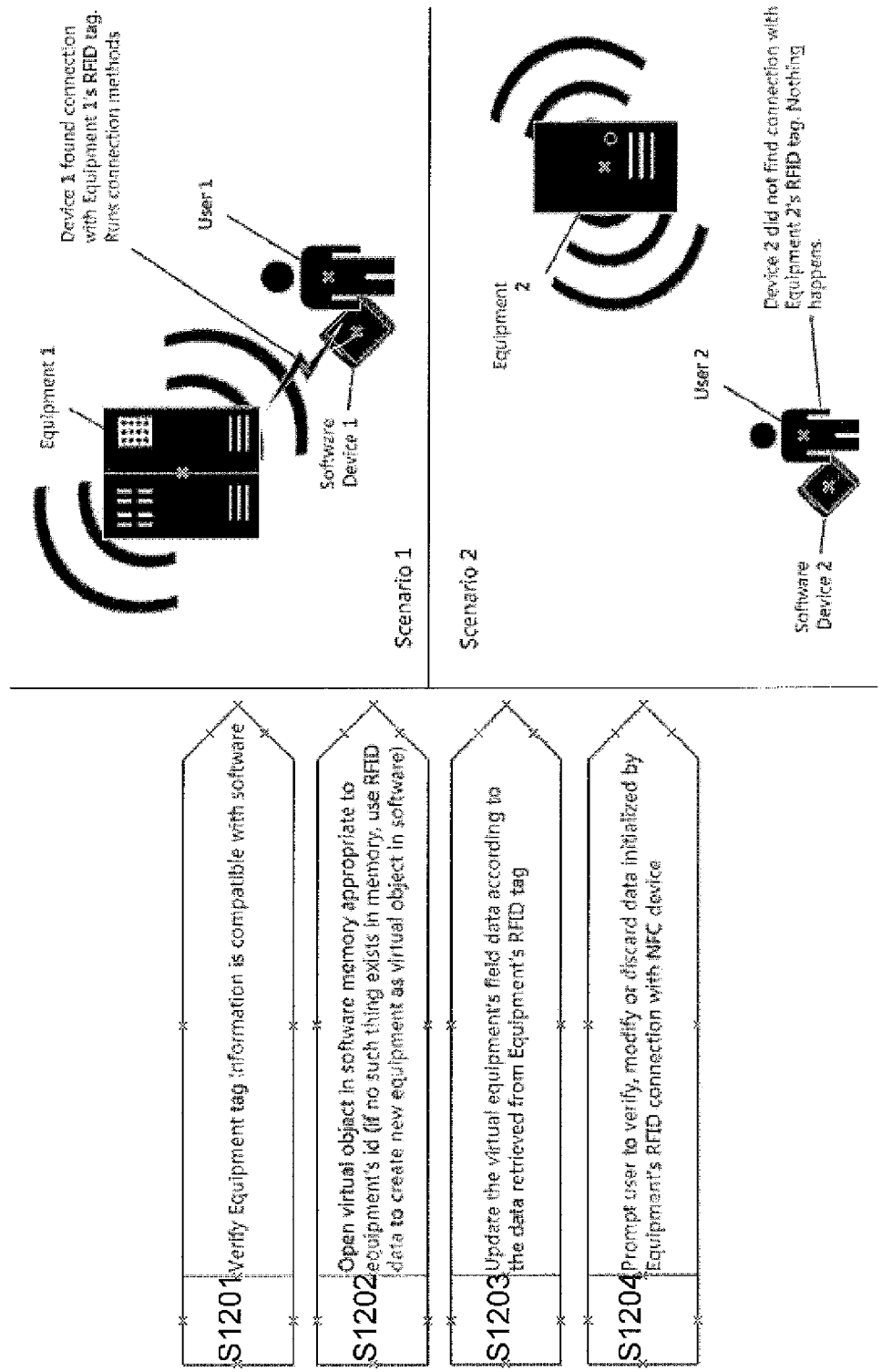
FIG. 12 illustrates an NFC/RFID communication by the system according to an exemplary embodiment of the invention.

FIG. 12 illustrates a method that may be run after the system 100 connects to equipment using NFC or RFID, according to an exemplary embodiment of the invention. The method may include verifying equipment tag information is compatible with the software of the system 100 (S1201). Next, a virtual object can be opened in memory appropriate to an identifier (ID) of the equipment (S1202). If no ID exists in memory, NFC/RFID data can be used to create new equipment as a virtual object. Further, the virtual equipment's field data can be updated according to the data retrieved from the equipment's NFC/RFID tag (S1203). Lastly, the user can be prompted to verify, modify, or discard data initialized by the equipment's NFC/RFID connection with the NFC/RFID device (S1204). If one of these four steps fails, the current connection can be dropped and a new connection can be attempted.

Figure 13:
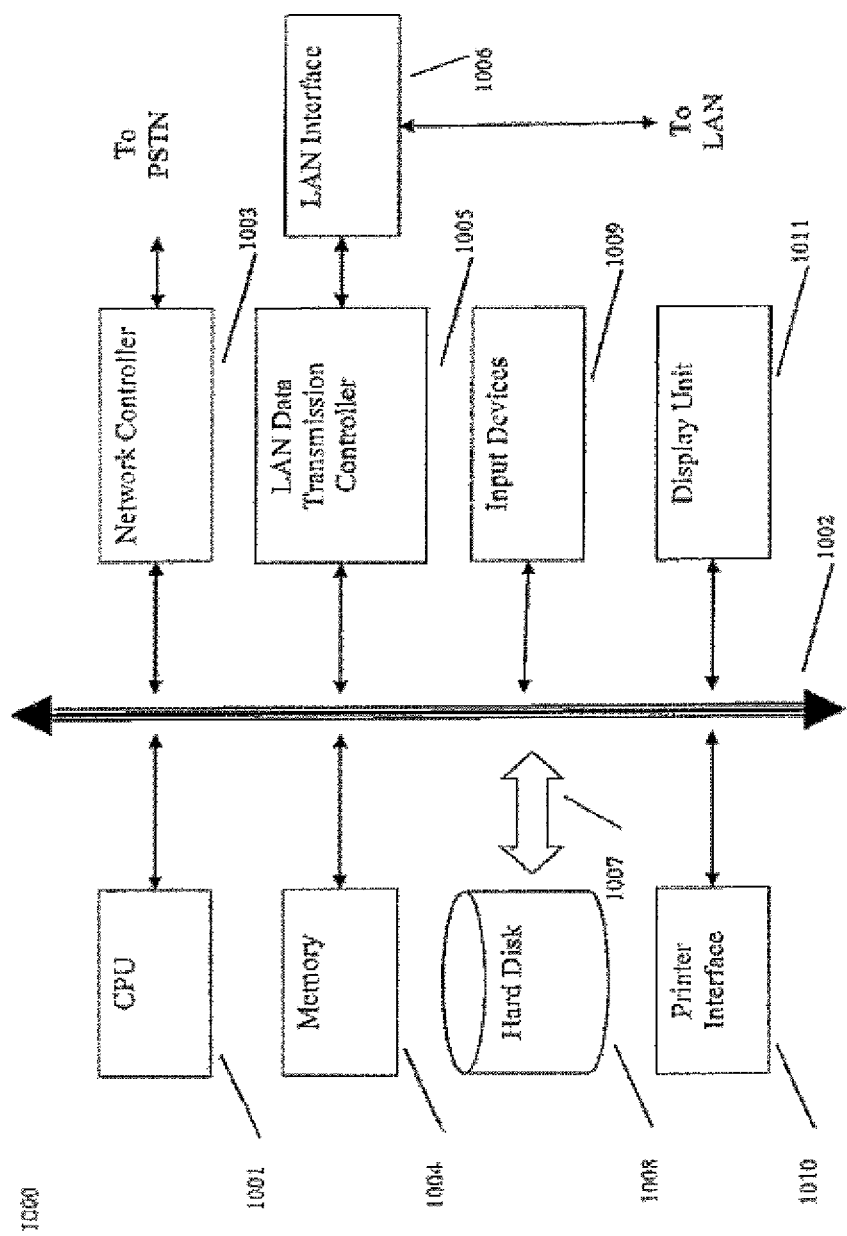
FIG. 13 shows an example of a computer system capable of implementing the method and apparatus according to embodiments of the present disclosure.

As discussed above, embodiments of the invention may be applied to a mobile system. However, the invention is not limited thereto, and may be applied to any computer system, such as illustrated in FIG. 10 or FIG. 13. The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Please note that while a particular graphical user interface (GUI) 200 is depicted in FIGS. 2-5, embodiments of the inventive concept are not limited thereto as the GUI 200 may be changed in various ways. For example, one or more of the illustrated modes may be omitted, additional modes may be present, selection of modes may be accomplished in a different manner from that illustrated, and different interactive or descriptive graphical elements may be used from those illustrated (e.g., labels may have different text, buttons may have different size, shapes, colors, etc., text fields may be replaced with drop down menus, lists, etc.).

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A mobile system for managing a facility, the mobile system comprising:
   a display;
   a transceiver configured to enable the mobile system to communicate wirelessly with a server that is remote from the mobile system;
   a local memory located within the mobile system, the memory comprising an application program; and
   a processor configured to execute the application program,
   wherein the application program is configured to read local data from the local memory and construct data objects representative of physical equipment within the facility from the read local data,
   wherein the application program reads data from a remote database of the server and updates the data objects using the read data if there is a connection to the remote database,
   where each data object is representative of a single piece of equipment in the facility and includes at least one data field for entering parameter data associated with the equipment and the data objects are organized into groups representing rooms of the facility,
   wherein the application program is configured to scan a radio frequency identification tag to identify one of the rooms and then automatically present a graphical user interface (GUI) on the display based on one of the data objects of the one room that enables a user to view and enter the parameter data for the equipment using the data field within the one data object, and
   wherein the application program stores the entered parameter data in the local memory and uploads the parameter data stored in the local memory to the remote database if the connection to the remote database is present,
   wherein the parameter data is compared by the system against a threshold to determine whether to present a warning on the display,
   wherein the program presents the warning when the parameter data is greater than a nominal value associated with the equipment minus a result of multiplying the nominal value by a tolerance percentage.

2. The mobile system of claim 1, wherein the GUI enables the user to enter the parameter data by providing a selectable option, which upon selection prompts the user to identify the equipment with an identifier.

3. The mobile system of claim 2, wherein the mobile system further comprises a camera and the selection controls the camera to capture an image of the equipment that is linked to the identifier.

4. The mobile system of claim 2, wherein the GUI enables the user to enter the parameter data by providing a data entry field that identifies a data parameter of the equipment and enables the user to enter data for the data parameter.

5. The mobile system of claim 4, wherein the entered data for the data parameter of the equipment is stored in the memory along with a timestamp.

6. The mobile system of claim 4, wherein the application is configured to perform an analysis of the data that has been entered for the data parameter of the equipment along with previously entered data to predict a future value of the data.

7. The mobile system of claim 4, wherein the application is configured to perform an analysis of the data that has been entered for the data parameter of the equipment and the GUI is configured to present a graph of the analyzed data, a trend line predicted from the analyzed data, and correlation with third party geographic or weather data on the display.

8. The mobile system of claim 4, wherein the program is configured to compare the entered data for the data parameter of the equipment against a normal operating range to determine whether the equipment is functioning properly.

9. The mobile system of claim 8, wherein the program is configured to provide a visual warning on the display if it is determined that the equipment is not functioning properly.

10. The mobile system of claim 8, wherein the GUI enables the user to set the system into a training mode that prevents the application from sending a message to a remote party if it is determined that the equipment is not functioning properly.

11. The mobile system of claim 8, wherein the application sends a message using the wireless transceiver if it is determined that the equipment is not functioning properly.

12. The mobile system of claim 11, wherein the message is sent via electronic mail, a short message service (SMS) text message, or a social network message across a network.

13. The mobile system of claim 1, wherein the program is configured to delete its locally stored data about the facility when it determines that the mobile system has left the facility.

14. The mobile system of claim 1, wherein the application is configured to control the transceiver to communicate with a radio tag identifying the equipment, and instruct the GUI to automatically display the parameter data.

15. The mobile system of claim 14, wherein the radio tag is a near field communication NFC tag or a radio frequency identification RFID tag.

16. The mobile system of claim 1, wherein the program creates a new data object representative of a new piece of equipment when the program does not recognize an identification of the tag.

17. The mobile system of claim 1, wherein the scanning of the tag causes the program to automatically interface with a metering device of the equipment to download latest data readings of the metering device to the system.

18. A mobile system for managing a facility, the mobile system comprising:
   a display;
   a transceiver configured to enable the mobile system to communicate wirelessly with a server that is remote from the mobile system;
   a local memory located within the mobile system, the memory comprising an application program; and
   a processor configured to execute the application program,
   wherein the application program is configured to read local data from the local memory and construct data objects representative of physical equipment within the facility from the read local data,
   wherein the application program reads data from a remote database of the server and updates the data objects using the read data if there is a connection to the remote database,
   where each data object is representative of a single piece of equipment in the facility and includes at least one data field for entering parameter data associated with the equipment and the data objects are organized into groups representing rooms of the facility,
   wherein the application program is configured to scan a radio frequency identification tag to identify one of the rooms and then automatically present a graphical user interface (GUI) on the display based on one of the data objects of the one room that enables a user to view and enter the parameter data for the equipment using the data field within the one data object, and wherein the application program stores the entered parameter data in the local memory and uploads the parameter data stored in the local memory to the remote database if the connection to the remote database is present, wherein the parameter data is compared by the system against a threshold to determine whether to present a warning on the display, wherein the program presents the warning when the parameter data is greater than a nominal value associated with the equipment minus a result of multiplying the nominal value by a tolerance percentage.

* * * * *